Patented Feb. 6, 1923.

1,444,204

UNITED STATES PATENT OFFICE.

JOHN F. O'CONNOR, OF CHICAGO, ILLINOIS, ASSIGNOR TO WILLIAM H. MINER, OF CHAZY, NEW YORK.

SIDE BEARING.

Application filed November 15, 1919. Serial No. 338,133.

*To all whom it may concern:*

Be it known that I, JOHN F. O'CONNOR, a citizen of the United States, residing at Chicago, in the county of Cook and State of Illinois, have invented a certain new and useful Improvement in Side Bearings, of which the following is a full, clear, concise, and exact description, reference being had to the accompanying drawings, forming a part of this specification.

This invention relates to improvements in side bearings.

The object of the invention is to provide an anti-friction bearing particularly adapted for use as a side bearing on railway cars and wherein the anti-friction element is so formed as to have its bearing surfaces automatically adjustable to variations in the angle between the surfaces between which the bearing is interposed and wherein is also combined means for automatically returning the anti-friction element to its central normal position after each actuation and provision made to prevent bodily shifting or bodily displacement of the anti-friction element with respect to its retaining member.

The invention furthermore consists in the improvements in the parts and devices and in the novel combinations of the parts and devices herein shown, described and made the subject matter of the claims.

In the drawing forming a part of this specification, Figure 1 is a part vertical sectional view, part side elevational view of portions of a car body bolster and truck bolster showing my improvements in connection therewith. Figure 2 is a vertical sectional view taken substantially on the line 2—2 of Figure 1. And Figure 3 is a detail sectional view of the anti-friction element proper and corresponding to the section line 3—3 of Figure 2.

In said drawing, 10 denotes the under side of a car body bolster and 11 the upper side of a track bolster. I have shown my improved bearing secured to the truck bolster, the improved bearing comprising, broadly, a retaining member or base casting A and an anti-friction element designated generally by the reference B.

The retaining member A, as shown, is preferably in the form of a casting and is of substantially box-like form, having parallel side walls 12—12, end walls 13—13, integral bottom wall 14 and corner perforated lugs or ears 15—15 by which the member A is adapted to be riveted or otherwise rigidly secured to the bolster. As clearly appears from Figures 1 and 2, the bottom wall 14 of the member A is adapted to serve as a bearing surface for the anti-friction element B although it will be evident that the anti-friction element B may bear directly on the bolster or a wear plate interposed between the element B and the bottom wall of the member A.

The anti-friction element B, as shown, is composed of two sections 16 and 17. One of said sections, preferably at reference 16, is provided with a centrally disposed socket 18 which is hemispherically formed at its upper end as indicated at 19. The other section 17 is provided with a centrally disposed upstanding projection or tenon 20 having an upper hemispherical end 21 adapted to extend within the said socket 18—19. The connection described, as will be apparent, is in the nature of a mortise and tenon joint and a slight clearance is left between the tenon and walls of the mortise so as to permit the necessary relative movement between the two sections 16 and 17, hereinafter described. Extending at right angles to the axis of the element B and at the center thereof, longitudinally, the sections 16 and 17 are provided with alined perforations 22—23 to accommodate a securing element such as the cotter 24. The ends of the cotter 24 are housed within counter bores 25—25 in the upper section 16.

As appears from an inspection of Figure 1, the anti-friction element B is of substantially cylindrical form so that the upper and lower bearing surfaces thereof which are adapted to contact with the bottom wall 14 of the member A and the under face of the body bolster 10, are concentric. In order that the upper and lower lines of contact of the bearing surfaces of the element B may automatically adjust themselves to the included angle between the bolsters, the sections 16 and 17 are beveled on their adjacent opposed faces as indicated at 26 and 27 in such a manner as to permit the upper section 16 to tilt relative to the lower section 17 about an axis perpendicular to the axis of the element B. It is obvious that this movement will not be interfered with by the mortise and tenon joint previously described, within the limits of adjustment required in the line of bodily movement of said element, said upper and lower sections being provided with inter-engaging transverse pivoted bearing portions and said sections being united by a longitudinally extending loose mortise and tenon joint connection and a transverse retaining pin extending through said mortise and tenon connection and said bearing portions, whereby said upper section is mounted for pivotal rocking movement relatively to said lower section in the direction of the line of bodily movement of said anti-friction element.

In witness that I claim the foregoing I have hereunto subscribed my name this 24th day of Oct., 1919.

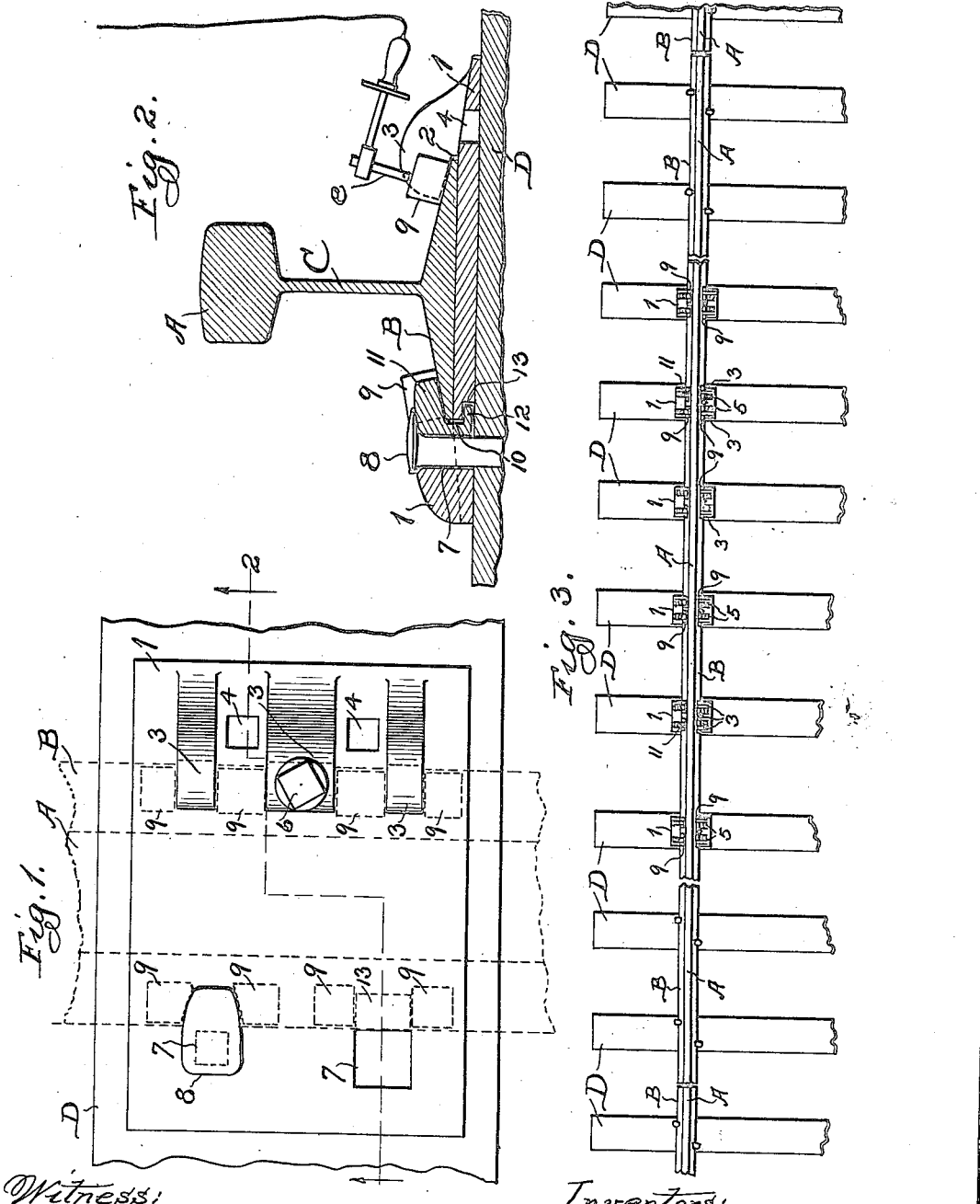

JOHN F. O'CONNOR.